United States Patent
Huyett et al.

(10) Patent No.: US 12,473,058 B2
(45) Date of Patent: Nov. 18, 2025

(54) SYSTEM APPARATUS AND METHOD FOR MULTI-AXIS GRAVITATIONAL CHANGE DATA MONITORING CAPTURE FOR IMPROVING SCALE MEASURING DEVICES IN DYNAMIC ENVIRONMENTS

(71) Applicants: David A. Huyett, Casselberry, FL (US); Cory Lambert, Willington, FL (US)

(72) Inventors: David A. Huyett, Casselberry, FL (US); Cory Lambert, Willington, FL (US)

(*) Notice: Subject to any disclaimer, the term of this patent is extended or adjusted under 35 U.S.C. 154(b) by 294 days.

(21) Appl. No.: 18/318,684

(22) Filed: May 16, 2023

(65) Prior Publication Data
US 2024/0076017 A1 Mar. 7, 2024

Related U.S. Application Data

(60) Provisional application No. 63/364,754, filed on May 16, 2022.

(51) Int. Cl.
*B63B 79/10* (2020.01)
(52) U.S. Cl.
CPC .................. *B63B 79/10* (2020.01)
(58) Field of Classification Search
CPC .............. B63B 79/10; B60N 2/0025; G01N 2035/00217
See application file for complete search history.

(56) References Cited

U.S. PATENT DOCUMENTS

2020/0396965 A1* 12/2020 Triener .................. A01K 31/12

FOREIGN PATENT DOCUMENTS

WO WO-2018094454 A1 * 5/2018 ............. B64U 10/14

* cited by examiner

*Primary Examiner* — Michael C Zarroli
(74) *Attorney, Agent, or Firm* — AEON Law, PLLC; Adam L. K. Philipp; Brendan Squire (57) ABSTRACT

A system, apparatus, and method for determining the weight of an item on board a vessel operated in a dynamic multi-axis gravitational operating environment. The apparatus includes a load plate to support the items to be weighed. Load cells support the load plate to measure a raw instantaneous weight of the item. A load sensor receives the raw instantaneous weight. An inertial measurement unit (IMU) is configured to measure an acceleration in each of three axes and an attitude representing a rotational acceleration about each of the three axes. A processor is configured to receive the raw instantaneous weight of the item and determine a corrected weight based on the acceleration in each of the three axes and the attitude. A universal wiring harness for an onboard scale includes a processor, multiple load cells, and an IMU. The load plate and harness are integrated with a structure of the vessel.

16 Claims, 8 Drawing Sheets

SYSTEM APPARATUS AND METHOD FOR MULTI-AXIS GRAVITATIONAL CHANGE DATA MONITORING CAPTURE FOR IMPROVING SCALE MEASURING DEVICES IN DYNAMIC ENVIRONMENTS

CROSS REFERENCE TO RELATED APPLICATION

This application claims the benefit of priority of U.S. provisional application No. 63/364,754, filed May 16, 2022, the contents of which are herein incorporated by reference.

BACKGROUND OF THE INVENTION

The present invention relates to stabilization systems, and more particularly to multi-axis scale stabilization for dynamic operating environments.

The present invention relates to particularly to a multi-axis weighing scale accuracy enhancement enabled stabilization for dynamic multi-axis gravitational operating environments like a surface oceanic going vessel, motor vehicles, aircraft, and space vehicles.

Determining weight measurements with stability and accuracy includes the instantaneous measurement of the force of gravity. At sea, the force of gravity is constantly changing due a vessel typically moving in multiple axes of movement from the oceanic or freshwater wave forces of the body of water, impacting gravity's typical stable constant value while on land. The waves impart forces in multiple degrees of freedom of the traditional 3 axes, including the addition of 3 rotational forces about these 3 axes for a total of 6 possible accelerations at once.

Large stabilizers are commonly used in the large luxury vessel industry. The stabilizers usually include large rotating masses and are designed with the generalized reduction in uncomfortably excessive bow movements. They perform a balancing to tune the stability of the vessels ride using these apparatuses which read the movement the vessel is experiencing and increasing or decreasing its ability to improve the ride stability experienced by the passengers of such yachts by varying the RPM of the device's rotating mass. In the marine vessel stabilizer, the results are less precise due to the entire vessel as its purpose is less precise than is required for the level of gravitational offsets required to perform weighing measurement. Consequently, much of the water's induced accelerations are not resolved locally where such measurements are performed.

Figure 1:
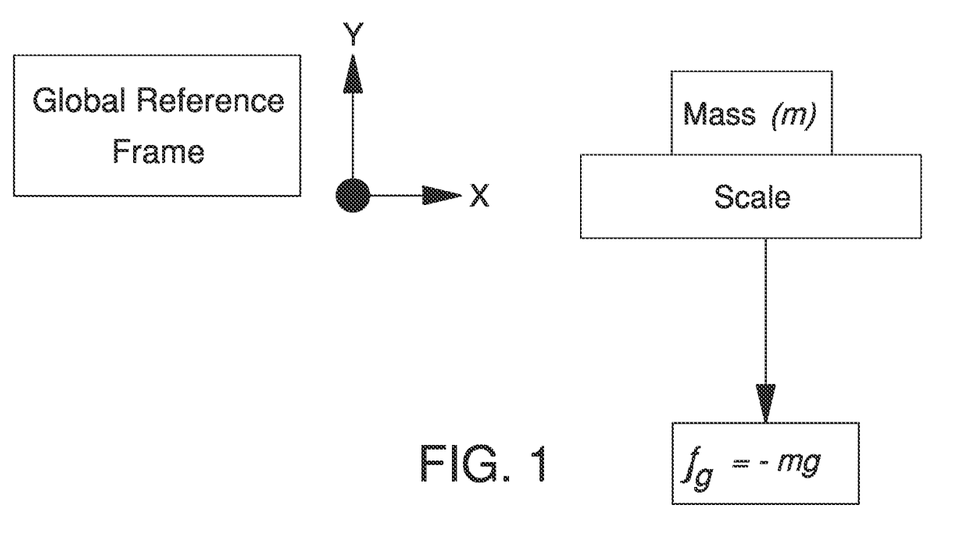
FIG. 1 is a diagram showing forces of a traditional scale in static environments.
Figure 2:
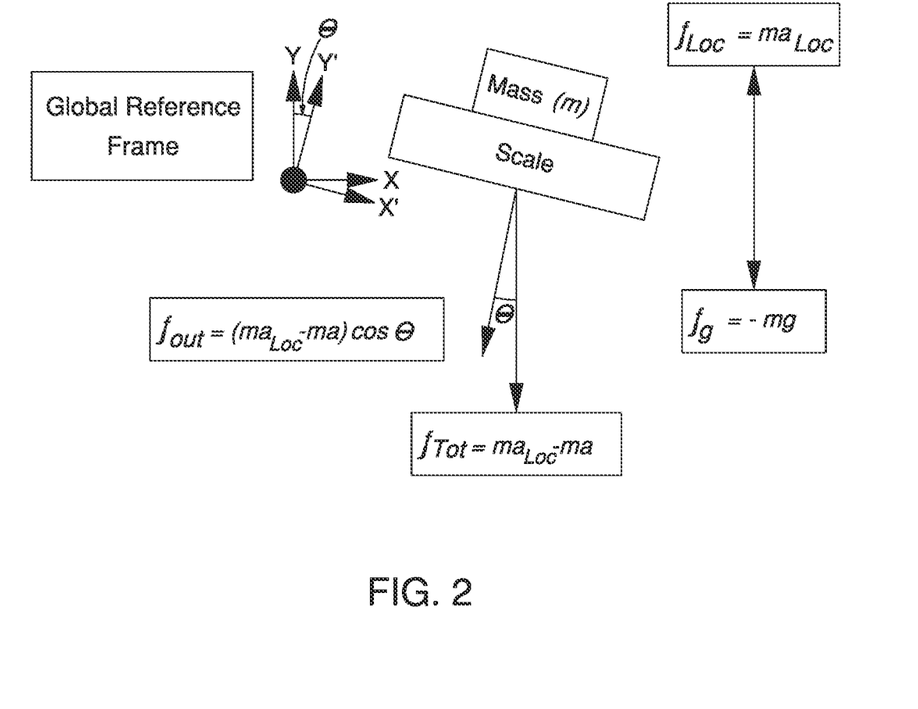
FIG. 2 is a diagram showing dynamic environment conditions in a free body diagram.

FIGS. 1 and 2 illustrate the forces experienced by a weight scale in both stationary and dynamic environments. The output values of a traditional scale calculate a known common average using the stable constant of Earth's gravity for the acceleration constant and a measured input mass for each static environment location use to equal actual weight displayed by the traditional scale apparatus. Accordingly, in a dynamic environment, a "land scale", for the purposes of characterizing previous digital weighing apparatuses are not capable of a stable accuracy due to their system's performance design architecture. In these static environment apparatuses, (FIG. 1), the reference axes of the scale aligns with the global reference axes of earth. The weighing apparatus and its reference mass experience a known gravitational force equivalent to approximately 9.81 m/s2 in the −Z-axis direction as traditionally taught what the definition of weight is defined as.

In contrast, as shown in FIG. 2, a dynamic environment introduces changes in attitude of the apparatus, as well as additional of changes in localized acceleration of the apparatus's reference frame with respect to the global reference frame. This fundamentally changes the acceleration experienced by the apparatus, and results in measurement errors of the previous traditional apparatuses. FIG. 2 below, illustrates this by applying a roll of θ as well as a localized acceleration, $\alpha_{LOC}$, to the environment. The change in attitude about the Z-axis changes the reference frame of the scale, and the localized acceleration applies another unknown quantities of forces that a traditional scale is unable to account for.

Determining weight of culinary ingredients including the force of gravity while at sea creates deviations in traditional scales outputs. At sea, the force of gravity is constantly changing due to waves and forces of the sea impacting gravity and ability to be affected by these sea forces in multiple directions at once. Plating food, delivering it to onboard guests is another layer of the problem. The chairs, dining table, and beds in multiple rooms can also benefit from stabilization of the accelerometer-controlled frame leg applications.

Gyro stabilizers are used in the camera industry. They are usually hand-held and require balancing and/or manual rebalancing to tune those apparatuses as mass changes, like changing lenses or camera types for example. Large changes in elevation are not built into these handheld devices, thus gravity affects the stabilizers not using accelerometers. In the marine vessel stabilizer, the results are less precise due to the entire vessel's movements.

A dynamic environment introduces changes in attitude of the apparatus, as well as the addition of changes in localized acceleration of the apparatus' reference frame with respect to the global reference frame. This fundamentally changes the acceleration experienced by the apparatus, and results in measurement errors. FIG. 2 below, illustrates this by applying a roll of θ as well as a localized acceleration, $\alpha_{LOC}$, to the environment. The change in attitude about the Z-axis changes the reference frame of the scale, and the localized acceleration applies another unknown quantities of forces that a traditional scale is unable to account for.

Accordingly, there is a need for an improved system architecture, apparatus, and method for multi-axis scale weight measurement fin dynamic operating environments, even among the finest vessels produced in the world.

SUMMARY OF THE INVENTION

In one aspect of the present invention, a weighing scale for use in a dynamic multi-axis gravitational operating environment is disclosed. The weighing scale includes a load plate dimensioned to support one or more items to be weighed. One or more load cells support the load plate. The one or more load cells are configured to measure a raw instantaneous weight of the item. A load sensor is configured to receive the raw instantaneous weight of the item from each of the one or more load cells. An inertial measurement unit (IMU) is configured to measure an acceleration in each of three axes and an attitude representing a rotational acceleration about each of the three axes. A processor is configured to receive the raw instantaneous weight of the item and determine a corrected weight based on the acceleration in each of the three axes and the attitude.

In some embodiments, a housing contains each of the one or more load cells, the load sensor, the IMU, and the processor.

In some embodiments, a display, in communication with the processor, displays the corrected weight of the one or more items.

In some embodiments, a shared clock signal correlates the raw instantaneous weight of the one or more items with each of the acceleration and the attitude.

In some embodiments, the processor applies a vector rotation to the acceleration and the attitude. The processor determines a global reference frame for each acceleration axis.

In some embodiments, the one or more load cells includes multiple load cells disposed in a spaced apart relation to evenly support the load plate.

In other aspects of the invention, a harness assembly for a weighing scale adapted for use in a vessel operated in a dynamic multi-axis gravitational operating environment is disclosed. The harness assembly includes a processor configured to receive a raw instantaneous weight of an item and determine a corrected weight based on an acceleration in each of three axes and an attitude representing a rotational acceleration about each of the three axes. An inertial measurement unit (IMU) is configured to measure the acceleration in each of the three axes and the attitude. Multiple load cells are each configured to measure a raw instantaneous weight of an item. A load sensor is configured to receive the raw instantaneous weight from each of the multiple load cells. An electrical cable interconnects each of the IMU, the multiple load cells, and the load sensor with the processor.

In some embodiments, the harness assembly includes a display electrically connected with the processor.

In some embodiments, a battery is interconnected with the processor.

In some embodiments, a shared clock signal correlates the raw instantaneous weight of the item with each of the acceleration and the attitude.

In some embodiments, the processor applies a vector rotation to the acceleration and the attitude. The processor is configured to determine a global reference frame for each acceleration axis.

In other aspects of the invention, a method of measuring a weight of an item on a vessel operated in a dynamic multi-axis gravitational operating environment is disclosed. The method includes measuring a raw instantaneous weight of the item by a load cell coupled with a weight sensor. An inertial measuring unit (IMU) measures an acceleration in each of three axes and an attitude, representing a rotational acceleration about each of the three axes. A processor applies a vector rotation to each of the acceleration and the rotational acceleration. The processor determines a global reference frame acceleration for each of the three axes and a corrected weight output based on the global reference frame acceleration and the raw instantaneous weight.

In some embodiments, the method includes synchronizing the raw instantaneous weight with the acceleration and the attitude via a shared clock signal.

In some embodiment, the method also includes applying a Kalman filtering to each of the global reference frame acceleration and the raw instantaneous weight.

These and other features, aspects and advantages of the present invention will become better understood with reference to the following drawings, description and claims.

DETAILED DESCRIPTION OF THE INVENTION

The following detailed description is of the best currently contemplated modes of carrying out exemplary embodiments of the invention. The description is not to be taken in a limiting sense but is made merely for the purpose of illustrating the general principles of the invention.

Broadly, embodiments of the present invention provide a system, apparatus, and method for multi-axis scale stabilization in dynamic operating environments.

A traditional scale, approximated in FIG. 1, normally operates in a static (Land based) environment. The free body diagram shows that a global reference plane and a reference plane of scale are equivalent. There are no reference frame rotations or external accelerations applied to the typical digital kitchen scale represented above like those experienced in a dynamic operating environment, such as those in a marine vessel's typical operating conditions.

The present invention will be discussed in a representative use in the context of the culinary arts. As will be appreciated, the invention has broader application to other contexts where accurate weight measurements are required in dynamic operating environments.

These conventional scales are the only available type used at sea today for the highest levels of culinary markets with little accuracy and do not account for readings in the dynamic operating environment that have constant rolling outputs of displayed weight as high as 20% or more. These inaccuracies are due to the reality of the dynamic operating environment, shown in FIG. 2. The apparatus and methods of the present invention, changes the paradigm and brings a new level of accuracy and stability capabilities for the chefs, guests, physical trainers, or medical personnel on yachts and other sea going vessels, like cruise liners, to provide accurate weigh measurement capabilities due to its ability to accurately compensate for all the 3 axes of accelerations and axis rotational accelerations, combining them into a single adjusted gravitational measurement.

The apparatus of the invention for sea going vessels used for weight measurements accounts for a reference frame rotation about one or more of three axes. In a non-limiting example, Z-Axis reference frame rotation because of the roll of the shipboard environment. Additionally, an acceleration in the positive Y direction is used in calculation as the vessel crests a wave. The resultant forces that the scale will experience, and measure, will not be equivalent to the desired force caused only by the acceleration of earth's standard gravity.

These conditions exist locally at the kitchen or various deck environment locations, even on vessels with advanced large vessel stabilization systems applied to tune the attitude of the entire vessel. The architecture and algorithms of the present invention creates a localized apparatus area correction for display of an accurate weight to the user under any sea condition and on any type of vessel. The instantaneous calculations provide the accurate adjusted force of gravity's acceleration (using 9.8 m/s as the standard) either higher, or lower, measurement required for small measurements of mass, while gravity's force is continuously higher and lower moving with the ocean's natural surface condition.

The following detailed description is a most unique and high performing apparatus carrying out these types of weight measurement. The description illustrates the method and principles of the invention with proven tested results that are one of a kind.

One of the advantages in the representative culinary environment is consistency of recipe compilations to maintain the quality of the menu items prepared without estimation, customizing and storing deviations of the recipes for guests with an allergy, recipe accommodations for a client's dislike of a particular ingredient, or recipe accommodations for a client's requested ingredient preferences. This leads to more desirable outcomes in the prepared food from accurate consistent flavor in the use of spices, sugar, and recipe ingredients loaded into the storage drive of the smart system. Inventory usage can also be tracked by the amounts of plated items by volume and compare to the vessels inventory to flag if or when supplies are running low, and when meal planning is created.

Figure 7:
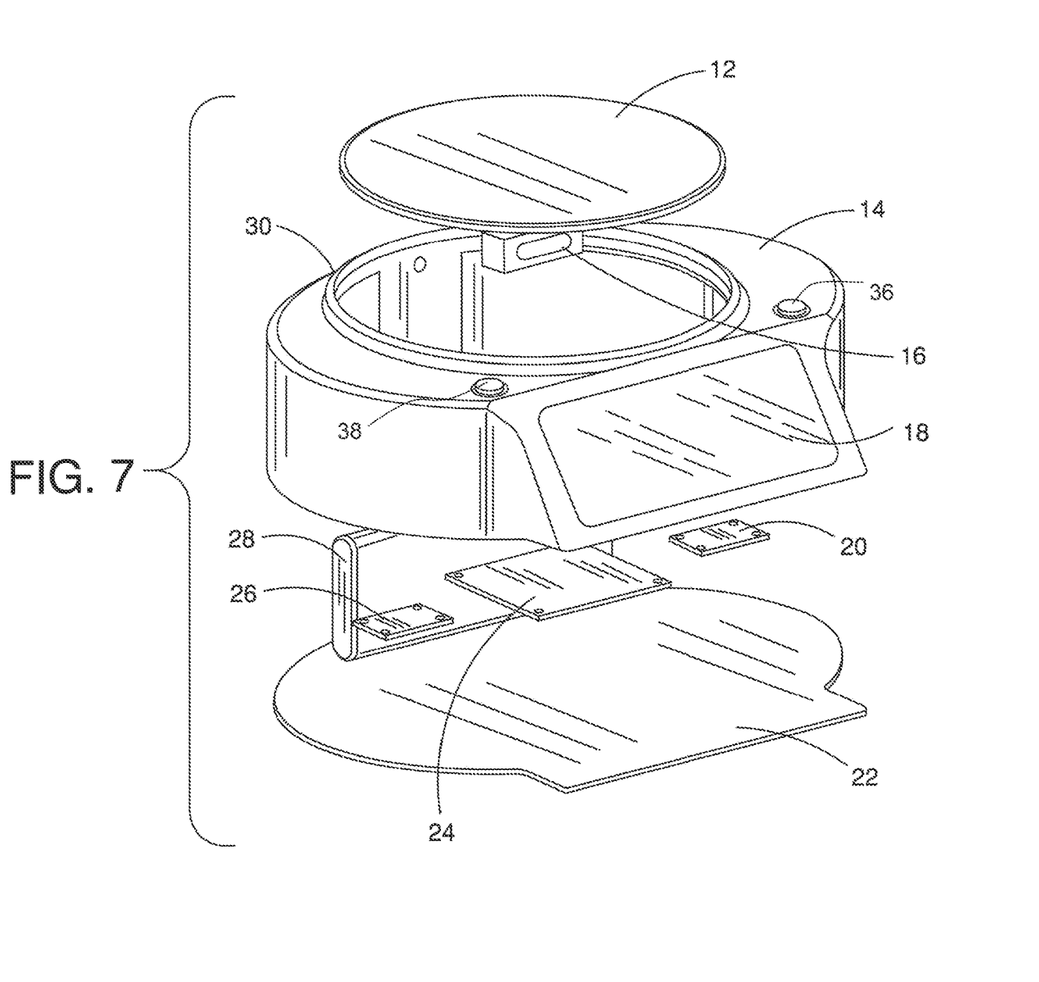
FIG. 7 illustrates a first embodiment of a multi-axis weighing scale for dynamic multi-axis gravitational operating environments.

A non-limiting embodiment of an apparatus will be described in reference to FIG. 7. This embodiment has a housing 14, the appearance and, from the user's perspective, permits the apparatus to function like a traditional scale. The housing 14 may include a base 22 to contain the components. The apparatus 10 includes a load plate 12, representing a top weighing scale area, on which to support a container (not shown), such as a tray or a bowl, for containing the ingredients for weighing. One or more load cells 16 are coupled with or support the load plate 12. The one or more load cells 16 measure the raw instantaneous weight of the object either by a single measurement of a single load cell 16 or a combination additional load cells 16. Preferably, the one or more load cells 16 are of very high-quality precision stainless steel for seaworthy durability and long-lasting precision that will not degrade over time, while retaining the calibration for long periods. When employed with multiple load cells 16, the load cells are disposed in a spaced apart relation to evenly support the load plate 12.

A weight sensor 20, which may be contained in a circuit card assembly (CCA), receives the instantaneous weight measurement from each of the one or more load cells 16. The apparatus is continuously recording acceleration and attitude data via the use of an inertial measurement unit (IMU) 25 with six degrees of freedom (DOF). The IMU 25 may include multiple accelerometers 26 with at least one accelerometer 26 for each triaxial movement and rotational axis. The accelerometers 26 collect acceleration data which is utilized by a processor 24 for determination of a corrected weight via a correction algorithm. A display 18 may be provided to present the corrected weight to the user. The apparatus may be powered by a power supply, such as a battery 28, which may be recharged or powered via a USB port 30.

Figure 3:
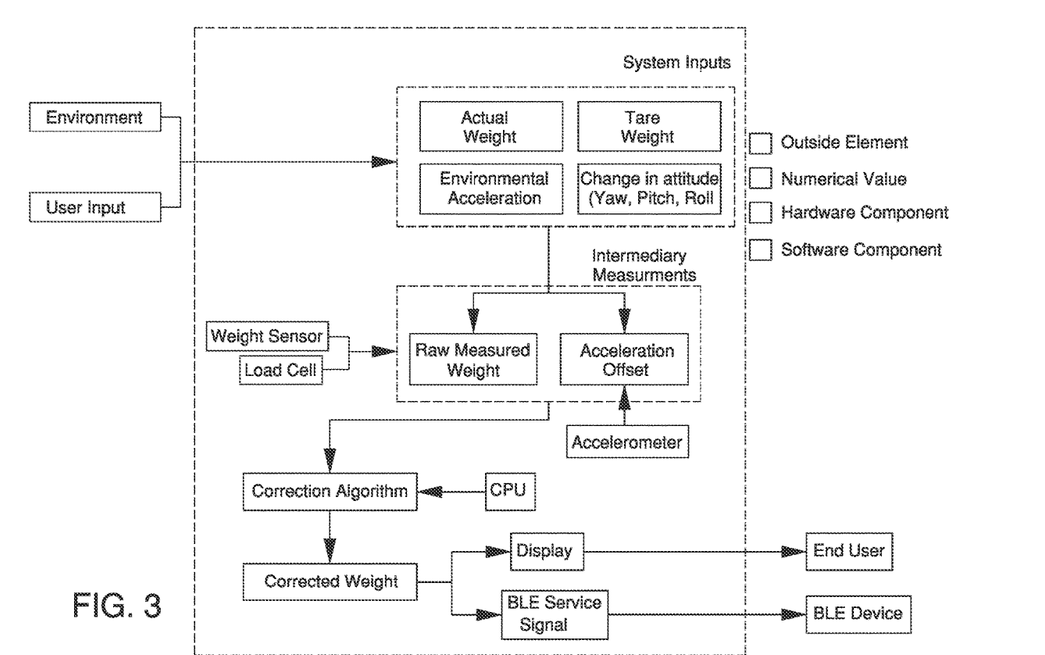
FIG. 3 is a representative system architecture utilized by the apparatus.

FIG. 3 shows a representative architecture utilized by the apparatus to implement the algorithmic approach to weight correction. The hardware elements, as described above, include a load cell 16 and weight sensor 20 to collect sea conditions of uncorrected weight measurements. The IMU 25 collects attitude and acceleration data and may utilizes CCA to perform a correction algorithm and display the corrected weight values to the user of the apparatus and on the display 18 in one or more selected units of measure.

At device startup, the apparatus may perform a tare function which sets the initial condition within the device's software variables. The load cell 16 and weight sensor 20 work in tandem to measure the weight of the object without making a correction for environmental conditions. The IMU 25 is continuously collecting scale and localized acceleration values along with attitude change data. The uncorrected numbers from the weight sensor 20 along with the instantaneous acceleration and attitude data from an accelerometer CCA 26 is then inputted into a correction algorithm which adjusts accurate display outputs of weight values for the user as if they were on land and stable.

Figure 4:
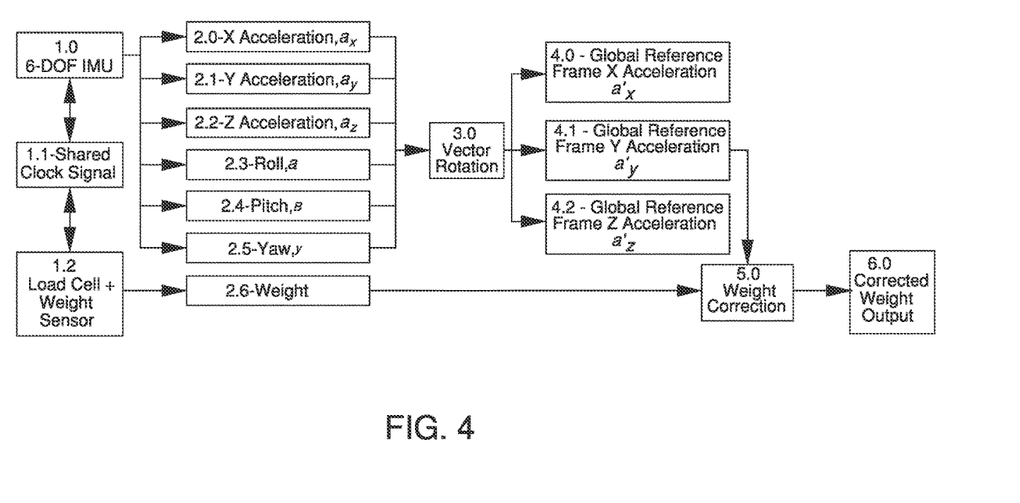
FIG. 4 is a generalized algorithm overview.

FIG. 4 shows a component diagram for implementing the algorithmic approach to weight correction. The IMU and weight sensor (blocks 1.0 and 1.2) share a clock signal (block 1.1) to ensure that instantaneous data is synchronized, and the correct acceleration and attitude offsets are applied to the raw weight measurements at the same clock time. The IMU 25 collects changes in acceleration across all three primary axes, $a_x$, $a_y$, $a_z$ of the scale reference frame and across the three roll axes, roll, pitch, and yaw. (blocks 2.0-2.5). The weight sensor 20 collects the instantaneous uncorrected weight (block 2.6). The acceleration data from the IMU 25 is then aligned to the global reference frame via a vector rotation.

Figure 5:
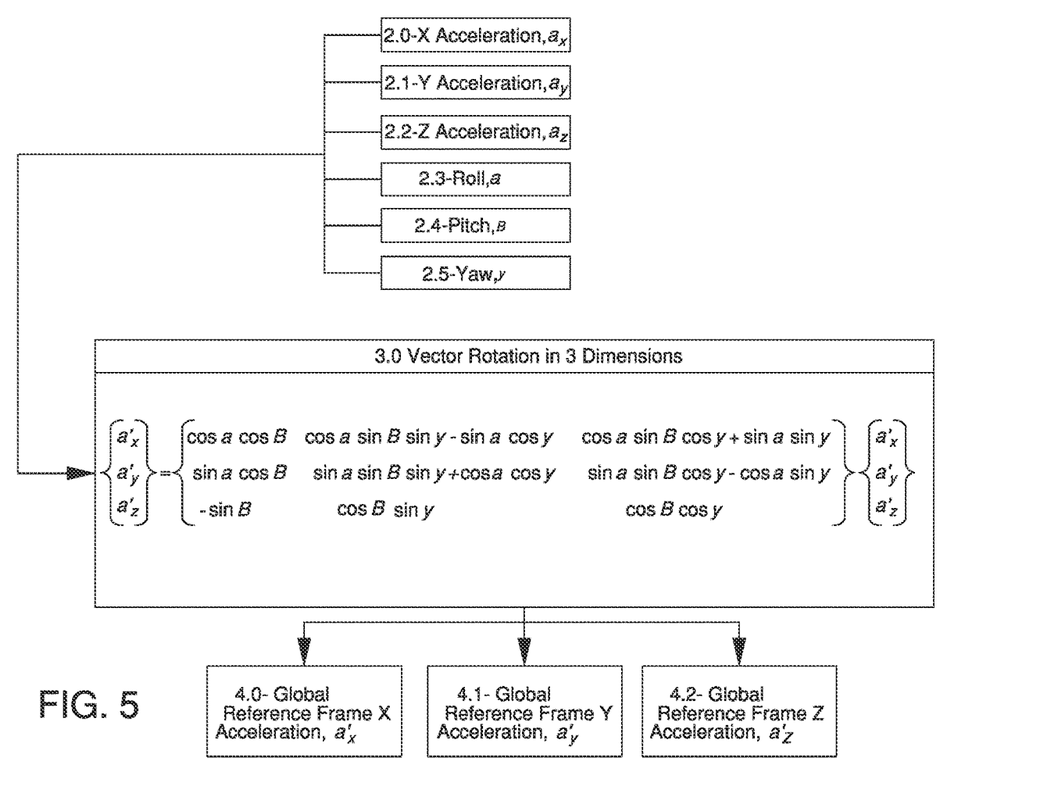
FIG. 5 is a diagram illustration principles of vector rotation of 6-degrees of freedom (DOF) inertial measurement unit (IMU) inputs.
Figure 6:
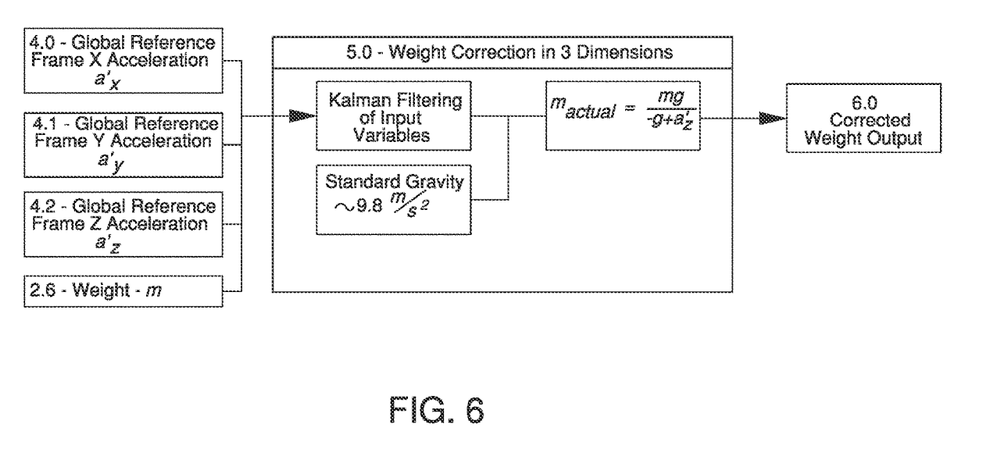
FIG. 6 illustrates an algorithmic process for weight correction with global-normalized reference frame accelerations.

The apparatus performs this function from collected data in the scale's local positional frame of reference. To do this, at block 3.0, the vector rotation is calculated about the attitudes and stored from the IMU 25 (block 3.0 in FIG. 5, an expanded version of which is shown in FIG. 6). This results in an earth-aligned set of acceleration vectors (blocks 4.0-4.2) which are stored and for final calculations (block 5.0) to offset the effects of the apparatus' local accelerations and attitude changes. A Kalman filter may applied to these stored values to mitigate the impacts of sensor noise in the final calculations.

Figure 8:
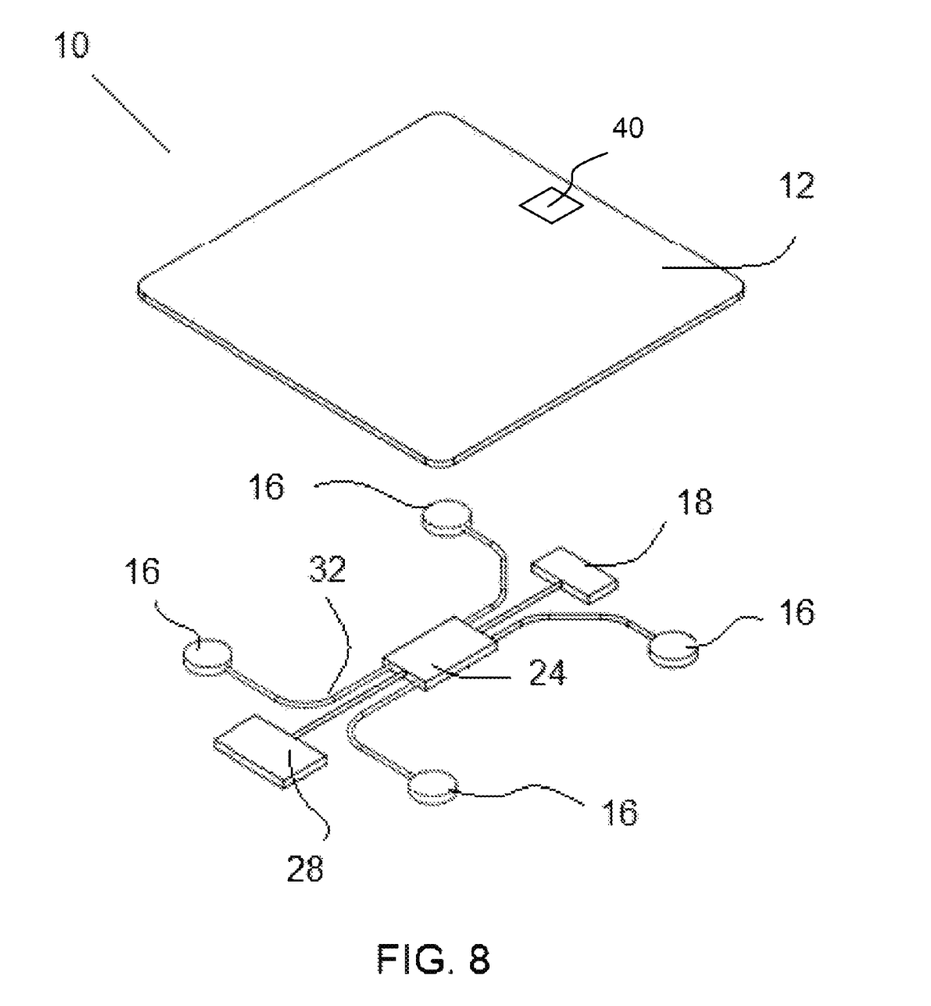
FIG. 8 illustrates a second embodiments of an alternative embodiment of the multi-axis weighing scale for dynamic multi-axis gravitational operating environments

A second non-limiting embodiment of the invention is shown in reference to FIG. 8. In this embodiment, the primary components are interconnected with a conductor 32 to form a wiring harness assembly 10 to form a universal weighing scale component when combined with a variety of load plates 12 of various dimensions. In this embodiment, the load plate 12 may be integrated with existing structures of the vessel, such as a floor or a countertop.

The wiring harness assembly 10 may be supported on the floor or countertop or be carried within a recess defined within the support surface of the vessel. The wiring harness assembly 10 is positioned subjacent to the load plate 12 to provide a corrected measurement scale at various positions on the vessel. By way of non-limiting example, the load plate 12 may be integrated with a surface of a food preparation area in a galley of the vessel. Likewise, the load plate 12 may be a floor tile within a fitness center located on board the vessel. Similarly, the load plate 12 may be incorporated with a medical laboratory, dispensary, or clinic on board the vessel. The load plate 12 may also be incorporated with a floor of a cargo compartment to facilitate an accurate determination of cargo weights as stores are depleted or accessed in transit of the vessel to facilitate maintaining the vessel's center of gravity by positioning or repositioning of the cargo.

The load plate 12 is supported by one or more load cells 16 coupled with the processor 24. The weight sensor 20 is also coupled with the processor 24 via the harness 32.

Likewise, the harness 32 provides an interconnection of the components with the power source, such as battery 28. The load plate 12 may be formed of a transparent material, such as tempered glass, to permit viewing of the display 18 beneath the load plate 12. Alternatively, the load plate may include a window 40 to permit viewing of the display 18.

The length of the cables 32 forming the harness 10 may be selected to accommodate a variety of dimensions of the load plate 12, with an excess cable length stowed beneath the load plate 12 when the harness is utilized with smaller dimensioned load plates 12.

Preferably, the cables for data or electrical harnesses are first assembled utilizing best industry standards set forth by the LabView standards of quality and performance to meet the apparatuses' specific design goals of precision weight measurement in a sea-worthy environment containing salt air, high and low temperatures possible and temperature shock conditions from but not limited to a door opening in the colder sea climate areas and or the opposite. The apparatus' wiring and sensor suite should also be resilient to the effects of vibration that are common in the dynamic operating condition while at sea.

It should be understood, of course, that the foregoing relates to exemplary embodiments of the invention and that modifications may be made without departing from the spirit and scope of the invention as set forth herein.

We claim:

1. A weighing scale for use in a dynamic multi-axis gravitational operating environment, comprising:
   a load plate dimensioned to support one or more items to be weighed;
   one or more load cells supporting the load plate, the one or more load cells configured to measure a raw instantaneous weight of the item;
   a load sensor configured to receive the raw instantaneous weight of the item from each of the one or more load cells;
   an inertial measurement unit (IMU) configured to measure an acceleration in each of three axes and an attitude representing a rotational acceleration about each of the three axes; and
   a processor configured to receive the raw instantaneous weight of the item and determine a corrected weight based on the acceleration in each of the three axes and the attitude.

2. The weighing scale of claim 1, further comprising:
   a housing containing each of the one or more load cells, the load sensor, the IMU, and the processor.

3. The weighing scale of claim 1, further comprising:
   a display, in communication with the processor to display the corrected weight of the one or more items.

4. The weighing scale of claim 1, further comprising:
   a shared clock signal to correlate the raw instantaneous weight of the one or more items with each of the acceleration and the attitude.

5. The weighing scale of claim 1, wherein the processor applies a vector rotation to the acceleration and the attitude.

6. The weighing scale of claim 5, wherein the processor determines a global reference frame for each acceleration axis.

7. The weighing scale of claim 1, the one or more load cells further comprising:
   multiple load cells disposed in a spaced apart relation to evenly support the load plate.

8. A harness assembly for a weighing scale adapted for use in a vessel operated in a dynamic multi-axis gravitational operating environment, comprising:
   a processor configured to receive a raw instantaneous weight of an item and determine a corrected weight based on an acceleration in each of three axes and an attitude representing a rotational acceleration about each of the three axes;
   an inertial measurement unit (IMU) configured to measure an acceleration in each of the three axes and the attitude;
   multiple load cells each configured to measure a raw instantaneous weight of an item;
   a load sensor configured to receive the raw instantaneous weight from each of the multiple load cells; and
   an electrical cable interconnecting each of the IMU, the multiple load cells, and the load sensor with the processor.

9. The harness assembly of claim 8, further comprising:
   a display electrically connected with the processor.

10. The harness assembly of claim 8, further comprising:
    a battery interconnected with the processor.

11. The harness assembly of claim 8, further comprising:
    a shared clock signal to correlate the raw instantaneous weight of the item with each of the acceleration and the attitude.

12. The harness assembly of claim 8, wherein the processor applies a vector rotation to the acceleration and the attitude.

13. The harness assembly of claim 12, wherein the processor determines a global reference frame for each acceleration axis.

14. A method of measuring a weight of an item on a vessel operated in a dynamic multi-axis gravitational operating environment, comprising:
    measuring a raw instantaneous weight of the item by a load cell coupled with a weight sensor;
    measuring, by an inertial measuring unit (IMU), an acceleration in each of three axes and an attitude, representing a rotational acceleration about each of the three axes;
    applying, by a processor, a vector rotation to each of the acceleration and the rotational acceleration;
    determining, by the processor, a global reference frame acceleration for each of the three axes; and
    determining, by the processor, a corrected weight output based on the global reference frame acceleration and the raw instantaneous weight.

15. The method of claim 14, further comprising:
    synchronizing the raw instantaneous weight with the acceleration and the attitude via a shared clock signal.

16. The method of claim 15, further comprising:
    applying a Kalman filtering to each of the global reference frame acceleration and the raw instantaneous weight.

* * * * *